United States Patent
Toyoda et al.

(10) Patent No.: US 8,035,681 B2
(45) Date of Patent: *Oct. 11, 2011

(54) PANORAMIC IMAGING DEVICE

(75) Inventors: Takashi Toyoda, Daito (JP); Yoshizumi Nakao, Daito (JP); Yasuo Masaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1093 days.

This patent is subject to a terminal disclaimer.

(21) Appl. No.: 11/837,836

(22) Filed: Aug. 13, 2007

(65) Prior Publication Data

US 2008/0036852 A1    Feb. 14, 2008

(30) Foreign Application Priority Data

Aug. 11, 2006  (JP) .................................. 2006-219158

(51) Int. Cl.
  *G02B 17/00* (2006.01)
  *H04N 7/00* (2006.01)
(52) U.S. Cl. ................ 348/36; 348/37; 348/38; 348/39; 359/725; 359/726
(58) Field of Classification Search .............. 348/36–39, 348/373, 374; 353/69; 359/626, 725, 726
  See application file for complete search history.

(56) References Cited

U.S. PATENT DOCUMENTS

| | | | |
|---|---|---|---|
| 3,113,484 A | 12/1963 | Baker | |
| 4,900,914 A | 2/1990 | Raff et al. | |
| 7,113,217 B2 * | 9/2006 | Nilson et al. | 348/373 |
| 7,520,621 B2 * | 4/2009 | Kitabayashi | 353/69 |
| 7,589,786 B2 * | 9/2009 | Nilson et al. | 348/373 |
| 7,595,838 B2 * | 9/2009 | Nilson et al. | 348/374 |
| 2005/0046944 A1 | 3/2005 | Shenderova et al. | |
| 2005/0253834 A1 | 11/2005 | Sakamaki et al. | |
| 2009/0225432 A1* | 9/2009 | Toyoda et al. | 359/626 |

FOREIGN PATENT DOCUMENTS

| | | |
|---|---|---|
| EP | 0 292 764 A2 | 11/1988 |
| EP | 1 847 873 A1 | 10/2007 |
| GB | 844821 | 8/1960 |

(Continued)

OTHER PUBLICATIONS

Japanese Office Action dated May 20, 2008 including English translation (Six (6) pages). Japanese Office Action dated Aug. 19, 2008 w/English translation (six (6) pages).

*Primary Examiner* — Quang N. Nguyen
(74) *Attorney, Agent, or Firm* — Crowell & Moring LLP

(57) ABSTRACT

A panoramic imaging device comprises: a photodetector array; a lens array having, on one plane, a center lens for receiving light in a front range of 36° to form a central unit image on the photodetector array, and left and right side lenses for receiving lights in left and right ranges each of 72° in capture angle of 180°; and four prisms in two pairs placed facing the side lenses. The two pairs of left and right prisms (more inclined and less inclined pairs) collect lights in divided two pairs of left and right ranges each of 36° in the 72° range (pairs closer to, and farther from, the front range), respectively, to form four side unit images on the photodetector array which are combined with the central unit image to reproduce a panoramic image without using wide-angle lenses or complex image correction process.

4 Claims, 5 Drawing Sheets

FOREIGN PATENT DOCUMENTS

| | | |
|---|---|---|
| JP | 2003-134373 A | 5/2003 |
| JP | 2003-207836 A | 7/2003 |
| JP | 2004-004869 A | 1/2004 |
| JP | 2005-26786 A | 1/2005 |
| JP | 2005-51419 A | 2/2005 |
| JP | 2005-109785 A | 4/2005 |
| JP | 2005-202153 A | 7/2005 |
| JP | 2006-25340 A | 1/2006 |
| JP | 2006-129391 A | 5/2006 |

* cited by examiner

PANORAMIC IMAGING DEVICE

CROSS-REFERENCE TO RELATED APPLICATIONS

This application contains related subject matter to the Assignee's co-pending application Ser. Nos. 11/846,806, filed Aug. 29, 2007, and 11/736,267, filed Apr. 17, 2007.

BACKGROUND OF THE INVENTION

1. Field of the Invention

The present invention relates to a panoramic imaging device.

2. Description of the Related Art

Various devices for capturing images positioned therearound in a wide capture angle or range are known, such as a monitor camera and a monitoring system for monitoring obstacles around a car. For example, a known camera device for monitoring three directions around a car, that are front, left and right, uses prisms placed on the light entrance side of an imaging element, such that the prisms refract or bend lights entering in the left and right directions or ranges so as to form images in predetermined areas on the imaging element, while forming an image in a separate area on the imaging element based on light entering in the front direction or range without passing through the prisms. The formed left and right images and the formed front image are separately displayed on a monitor screen (refer, for example, to Japanese Laid-open Patent Publication 2003-207836). A known wide-angle imaging device uses multiple optical imaging units for forming optical images on an image plane or focal plane, such that the optical axes of the multiple optical imaging units intersect at one point near a lens, and that the image viewing angles or ranges of adjacent ones of the optical imaging units are contiguous. The images captured by the respective optical imaging units are reproduced as a panoramic image, which is displayed on a monitor screen (refer, for example, to Japanese Laid-open Patent Publication 2006-25340).

In the known imaging devices, there are problems to be solved. The camera device described in the first cited patent publication (Japanese Laid-open Patent Publication 2003-207836) makes it possible to obtain images in the three directions, front and left/right of the car. However, these images are displayed on the monitor screen as three independent images without being reproduced as a continuous image (panoramic image). Further, in order to allow the camera device to monitor a wide range such as about 180° (degrees) around the camera device, each of the three images in the three directions is required to have a picture angle of 60° (degrees) or larger. This requires the use of so-called wide-angle lenses as imaging lenses. However, a wide-angle lens is likely to cause barrel distortion at periphery of an image captured thereby. Although it is possible to digitally correct the barrel distortion at the peripheries of images, a complex program is necessary to correct the barrel distortion.

The wide-angle imaging device described in the second cited patent publication (Japanese Laid-open Patent Publication 2006-25340) makes it possible to reproduce a panoramic image from the images captured by the respective optical imaging units. When the wide-angle imaging device is used as a monitor camera, a high monitoring function can be obtained without causing so-called dead angles (non-imaging area) between the images. However, this wide-angle imaging device has a problem in that this imaging device is likely to become large in volume in its entirety because the multiple optical imaging units are placed three-dimensionally.

SUMMARY OF THE INVENTION

An object of the present invention is to provide a panoramic imaging device for imaging a panoramic image with a picture angle of at least approximately 180°, which can be formed without using a wide-angle lens having a capture angle larger than 60°, and which can combine multiple images into a panoramic image without complex image correction and without causing unnatural transition between adjacent images to remain, and further which can be reduced in volume and thickness in its entirety.

According to a first aspect of the present invention, this object is achieved by a panoramic imaging device comprising: an optical lens system for collecting light entering in a capture angle of at least 180° so as to form images on a predetermined focal plane; imaging means placed at the focal plane for converting the images formed by the optical lens system to electronic image information; and image reproducing means for subjecting the electronic image information obtained from the imaging means to imaging processing so as to reproduce a panoramic image.

The optical lens system comprises: an optical lens array including a center lens having an optical axis and formed on one plane for receiving light entering in a front range in the capture angle, and also including pairs of left and right side lenses formed on the one plane and on left and right sides of the center lens, respectively, and which have optical axes parallel to that of the center lens, so as to respectively receive lights entering in left and right ranges in the capture angle, which are divided into pairs of left and right ranges such that the pairs of left and right side lenses receive lights entering in the divided pairs of the left and right ranges, respectively; and prisms placed on a light entrance side of the side lenses for bending and collecting the lights entering in the divided pairs of the left and right ranges in the capture angle for the side lenses to receive, so as to guide and direct the lights to, and along the optical axes of, the side lenses, respectively.

The imaging means is formed of a photodetector array placed at a predetermined distance from, and in parallel to, the optical lens array for capturing an image formed by the center lens and images formed by the left and right side lenses. Further, the image reproducing means combines the image formed by the center lens in the front range in the capture angle with the images respectively formed by the pairs of left and right side lenses in the divided pairs of left and right ranges in the capture angle so as to reproduce a panoramic image with a picture angle of at least 180°.

Preferably, each of the lights received by the center lens and the side lenses is light entering in a range smaller than approximately 60° in the capture angle of at least 180°.

Further preferably, the capture angle is approximately 180°, wherein the light received by the center lens is light entering in a front range of approximately 36° in the capture angle, and wherein the side lenses are composed of two left side lenses and two right side lenses which receive lights entering in divided two pairs of left and right ranges each of approximately 36°, respectively, which enter in a pair of left and right ranges each of approximately 72° in the capture angle, respectively.

Still further preferably, the capture angle is approximately 180°, wherein the light received by the center lens is light entering in a front range of approximately 26° in the capture angle, and wherein the side lenses are composed of three left side lenses and three right side lenses which receive lights entering in divided three pairs of left and right ranges each of approximately 26°, respectively, which enter in a pair of left and right ranges each of approximately 77° in the capture angle, respectively.

According to a second aspect of the present invention, the above-described object is achieved by a panoramic imaging device comprising: an optical lens system for collecting light entering in a capture angle of approximately 180° so as to form images on a predetermined focal plane; imaging means placed at the focal plane for converting the images formed by the optical lens system to electronic image information; and image reproducing means for subjecting the electronic image information obtained from the imaging means to imaging processing so as to reproduce a panoramic image.

The optical lens system comprises: an optical lens array including a center lens having an optical axis and formed on one plane for receiving light entering in a front range of approximately 36° in the capture angle, and also including two pairs of left and right side lenses formed on the one plane and on left and right sides of the center lens, respectively, and which have optical axes parallel to that of the center lens, so as to respectively receive lights entering in left and right ranges each of approximately 72° in the capture angle, which are divided into two pairs of left and right ranges each of approximately 36° such that the two pairs of left and right side lenses receive lights entering in the divided two pairs of the left and right ranges, respectively; and two pairs of left and right right-angle prisms placed on a light entrance side of the side lenses, and respectively facing the side lenses at positions to prevent interruption of the light entering the center lens in the front range of approximately 36°, for bending and collecting the lights entering in the divided two pairs of the left and right ranges each of approximately 36° in the capture angle for the side lenses to receive, so as to guide and direct the lights to, and along the optical axes of, the side lenses, respectively.

The imaging means is formed of a photodetector array placed at a predetermined distance from, and in parallel to, the optical lens array for capturing an image formed by the center lens and images formed by the two pairs of left and right side lenses. Further, the image reproducing means combines the image formed by the center lens in the front range of approximately 36° in the capture angle with four images respectively formed by the two pairs of left and right side lenses in the divided two pairs of left and right ranges each of approximately 36° in the capture angle so as to reproduce a panoramic image with a picture angle of approximately 180°.

The panoramic imaging device according to the present invention can be formed without using optical lenses having a large capture angle (wide-angle lenses) such as 60° or larger, making it possible for the formed images to have substantially no distortions, so that no complex process of image correction for the images is required when combining the images, and that images can be combined into a panoramic image of a picture angle of at least or approximately 180° without causing unnatural transition between adjacent images. This also makes it possible to reduce the volume and thickness of the entire panoramic imaging device.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
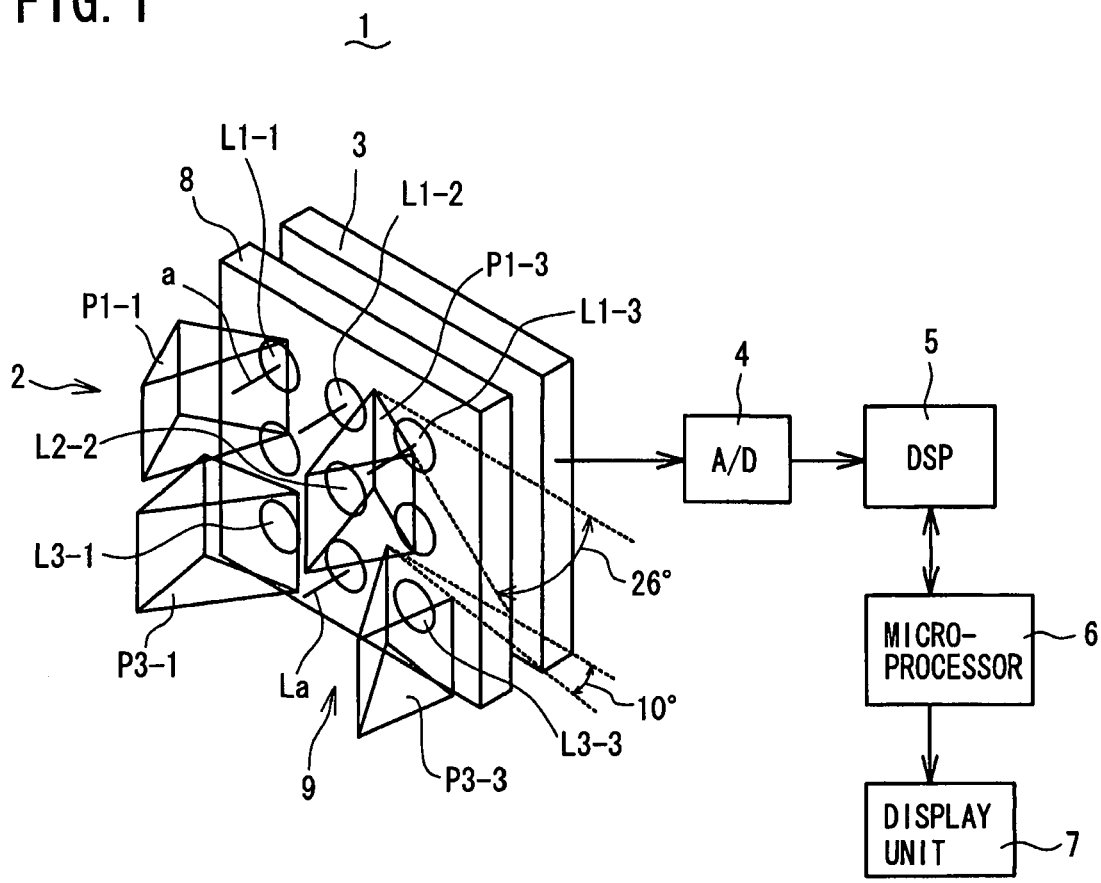
FIG. 1 is a schematic perspective view of a panoramic imaging device according to an embodiment of the present invention.

Embodiments of the present invention, as best mode for carrying out the invention, will be described hereinafter with reference to the drawings. The present invention relates to a panoramic imaging device. It is to be understood that the embodiments described herein are not intended as limiting, or encompassing the entire scope of, the present invention. Note that like parts are designated by like reference numerals, characters or symbols throughout the drawings.

Figure 2:
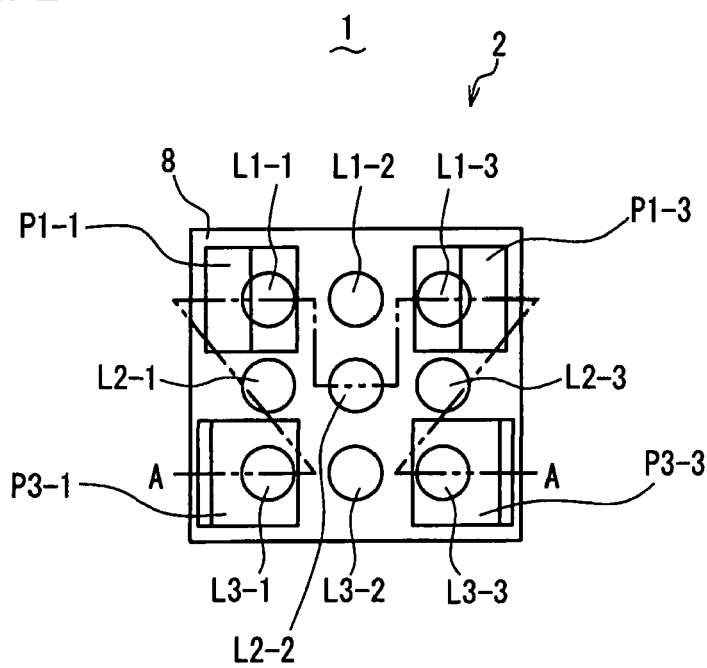
FIG. 2 is a schematic front view of an optical lens system in the panoramic imaging device.
Figure 3:
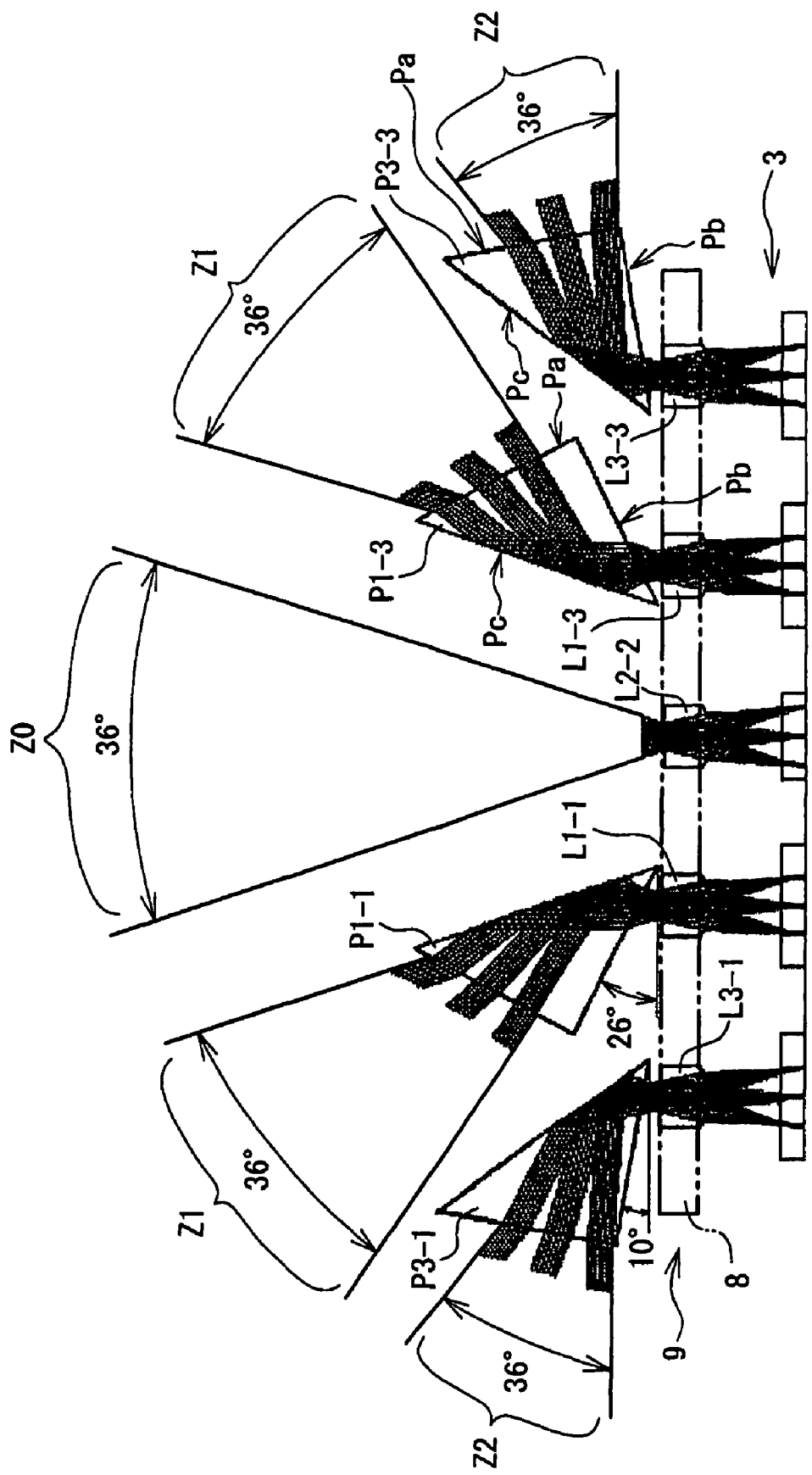
FIG. 3 is a schematic expanded cross-sectional view along line A-A in FIG. 2, showing an optical path diagram of the optical lens system of the panoramic imaging device with a light flux passing through each lens.

Referring to FIG. 1 to FIG. 5, a panoramic imaging device 1 according to an embodiment of the present invention will be described. As shown in FIG. 1 to FIG. 3, the panoramic imaging device 1 of the present embodiment comprises: an optical lens system 2 for collecting light entering therein in a capture angle (picture-taking angle) of at least 180° (approximately 180°) so as to form images on a predetermined focal plane; a photodetector array (claimed "imaging means") 3 placed at the focal plane of the optical lens system 2 for converting the images formed by the optical lens system 2 to electronic image information; and a processing circuit for signal processing and display. The processing circuit comprises: an A/D (Analog-to-Digital) converter 4 for converting the electronic image information from the photodetector array 3 to a digital signal; a DSP (Digital Signal Processor) 5 for receiving the digital signal of the electronic image information converted from the images by the photodetector array 3; and an image reproduction microprocessor (claimed "image reproducing means") 6 for subjecting the digital signal of the image information received by the DSP 5 to image processing to reproduce a panoramic image; and a display unit 7 such as a liquid crystal panel for displaying the panoramic image reproduced by the image reproduction microprocessor 6.

The optical lens system 2 according to the present embodiment comprises: an optical lens array 9 having 9 (nine) optical lenses L which have mutually parallel optical axes La, and which are arranged in a matrix of 3 (three) rows and 3 (three) columns and integrally formed as single convex lenses on one plane or surface of a transparent substrate 8; and four 45-45-

90 degree right-angle prisms P, two on the left and two on the right, placed on the light entrance side of the optical lens array 9 to face four optical lenses L, respectively. Hereafter, the respective optical lenses L are designated by, and distinguished from each other by, suffixes appended thereto and corresponding to the positions thereof in the matrix of 3 rows and 3 columns. For example, the optical lens L in row 1 (first row)-column 1 (first column) is designated by L1-1.

The four 45-45-90 degree right-angle prisms P are placed facing the optical lenses L1-1, L1-3, L3-1, L3-3, respectively. Hereafter, the respective 45-45-90 degree right-angle prisms P are also designated by, and distinguished from each other, by suffixes appended thereto and corresponding to the positions thereof. For example, the 45-45-90 degree right-angle prism P placed facing the optical lens L1-1 in row 1-column 1 is designated by P1-1 (refer to FIG. 1 and FIG. 2). As shown in FIG. 3, each of the 45-45-90 degree right-angle prisms P1-1, P1-3, P3-1, P3-3 has a cross-section of a right-angle isosceles triangle with two sides Pa, Pb containing the right angle and a hypotenuse Pc facing the right angle, and is inclined to the optical lens array 9.

The 45-45-90 degree right-angle prism P1-1 and the 45-45-90 degree right-angle prism P1-3 are inclined at a relatively large angle (approximately 26°) to the optical lens array 9, while the 45-45-90 degree right-angle prism P3-1 and the 45-45-90 degree right-angle prism P3-3 are inclined at a relatively small angle (approximately 10°) to the optical lens array 9. Note that FIG. 3 shows an expanded cross-section along line A-A in FIG. 2. All the nine optical lenses L1-1, L1-2, have a capture angle of 36°, which is smaller than 60° and is thus not relatively large, so that images formed by the respective optical lenses are substantially free of distortion. Note here that although not shown, a stop member is placed between the optical lens array 9 and each of the 45-45-90 degree right-angle prisms P1-1, P1-3, P3-1, P3-3. Further note that the optical lenses L1-1, L1-2, . . . are not required to be integrally formed on the transparent substrate 8, and e.g. can be held by a lens holder so as to be arranged on a two-dimensional plane.

As shown in FIG. 3, the optical lens L2-2 at a central position (hereafter referred to as "center lens") directly receives light entering in a front range of approximately 36° in the capture angle, while the four optical lenses L1-1, L1-3, L3-1, L3-3 (hereafter referred to as "side lenses") receive lights entering in left and right ranges each of approximately 72° in the capture angle, more specifically in two divided ranges each of approximately 36° in the left and right ranges, i.e. total four ranges each of approximately 36° through the 45-45-90 degree right-angle prisms P1-1, P1-3, P3-1, P3-3, respectively. Each of 45-45-90 right-angle prisms P1-1, P1-3, . . . is placed such that light enters through an outward side Pa of the two sides Pa, Pb containing the right angle, and is reflected by the hypotenuse Pc and emitted through the other side Pb, so as to guide and direct the light (to enter each optical lens L) to, and along the optical axis of, the each optical lens L. In the present specification, surfaces of each right-angle prism P for guiding and allowing light to enter through and for reflecting and emitting the light are referred to as "sides" and "hypotenuse" in order to describe such surfaces with reference to the optical path diagram of FIG. 3.

More specifically, as shown in FIG. 3, the 45-45-90 right-angle prisms P1-1 and P1-3 are arranged to bend and collect lights entering in ranges Z1 (hereafter referred to as "first left and right ranges") each of approximately 36° which are divided ranges in the left and right ranges each of approximately 72°, and which are adjacent to (closer to), and left and right of, the front range of approximately 36°, respectively, so as to guide the lights to the optical lenses L1-1, L1-3. On the other hand, the 45-45-90 right-angle prisms P3-1 and P3-3 are arranged to bend and collect lights entering in ranges Z2 (hereafter referred to as "second left and right ranges") each of approximately 36° which are divided ranges in the left and right ranges each of approximately 72°, and which are adjacent to, and left and right of, the first left and right ranges Z1, respectively, (i.e. which are farther from the front range of approximately 36° than the first left and right ranges Z1) so as to guide the lights to the optical lenses L3-1, L3-3.

The light collected by each of the 45-45-90 degree right-angle prisms P1-1, P1-3, P3-1, P3-3 is reflected by the hypotenuse Pc of each of the prisms P1-1, P1-3, P3-1, P3-3 and emitted through the other side Pb of each such prism facing the optical lens array 9, so that the thus emitted lights from the 45-45-90 degree right-angle prisms P1-1, P1-3, P3-1, P3-3 are collected by the side lenses L1-1, L1-3, L3-1, L3-3, respectively. Note that no portion of the 45-45-90 degree right-angle prisms P exists in the front range of approximately 36° in the capture angle as seen from the center lens L2-2, so that the light entering the center lens L2-2 is not prevented from being interrupted.

Putting in another way, the left and right side lenses L1-1, L1-3 and the left and right side lenses L3-1, L3-3 receive lights in left and right ranges each of 72° in the capture range of approximately 180°. A pair of left and right 45-45-90 degree right-angle prisms P1-1, P1-3 (more inclined to the optical lens array 9 than the 45-45-90 degree right-angle prisms P3-1, P3-3) bend and collect lights in a pair of first left and right ranges Z1 each of approximately 36° in the 72° range, and guide the lights to the side lenses L1-1, L1-3. On the other hand, a pair of left and right 45-45-90 degree right-angle prisms P3-1, P3-3 (less inclined to the optical lens array 9 than the 45-45-90 degree right-angle prisms P1-1, P1-3) bend and collect lights in a pair of second left and right ranges Z2 each of approximately 36° in the 72° range, and guide the lights to the side lenses L3-1, L3-3. Note here that it is apparent that the capture angle of approximately 180° can be expanded by simply increasing the capture range of each optical lens L and each prism P to bend, collect and guide light to each optical lens L.

Next, the photodetector array 3 will be described. The photodetector array 3 is placed at a predetermined distance from, and in parallel to, the optical lens array 9. More specifically, the photodetector array 3 has major planes parallel to those of the optical lens array 9. The photodetector array 3 used herein is a solid-state imaging element formed, for example, of a semiconductor substrate having imaging areas on a focal plane of the respective optical lenses L1-1, L1-2, . . . , and is, for example, a CMOS (Complementary Metal Oxide Semiconductor) image sensor. The solid-state imaging element (photodetector array 3) can also be a CCD (Charge Coupled Device).

Nine unit images F are formed on the photodetector array 3 by the nine optical lenses L1-1, L1-2, in the matrix of 3 rows and 3 columns. Similarly as in the optical lenses L1-1, L1-2, . . . , the respective unit images F are designated by, and distinguished from each other by, suffixes appended thereto and corresponding to the positions thereof in the matrix of 3 rows and 3 columns. For example, the unit image corresponding to the optical lens L1-1 is designated by F1-1. As will also be described with reference to FIG. 5, the unit image F2-2 formed by the center lens L2-2 is inverted up/down and left/right from an original image. On the other hand, the unit images F1-1, F1-3, F3-1, F3-3 formed by the side lenses L1-1, L1-3, L3-1, L3-3 are inverted only up/down from original images because the left/right inversion is eliminated by a mirror effect of each of the 45-45-90 degree right-angle prisms P1-1, P1-3, P3-1, P3-3.

Figure 4A:
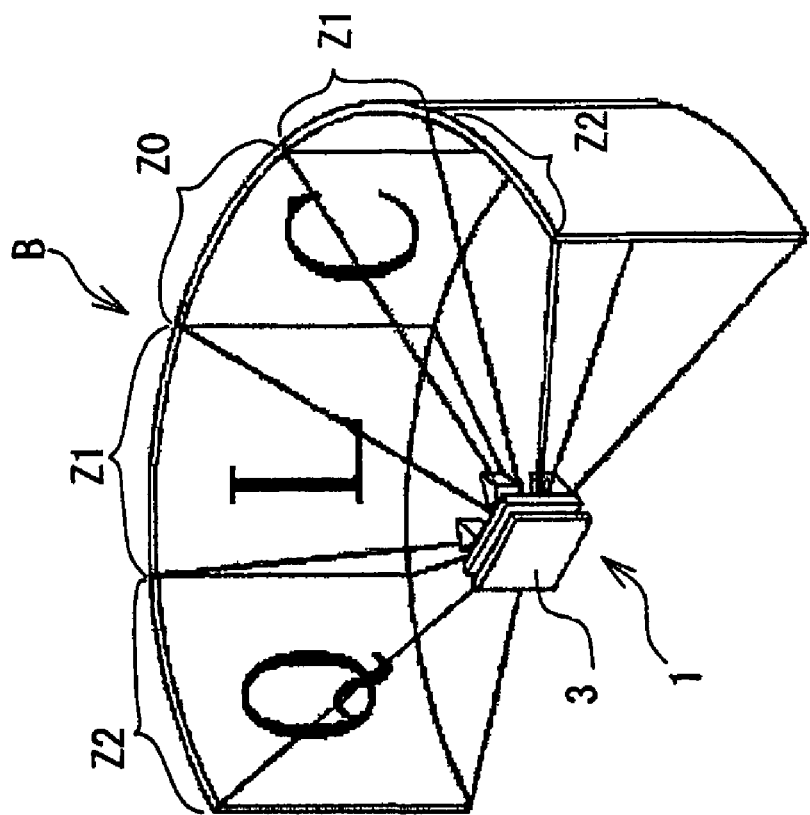
FIG. 4A and FIG. 4B are schematic perspective views of the panoramic imaging device placed facing a target object to be imaged in a range of 180° as seen from diagonally left above and diagonally right above, respectively.
Figure 4B:
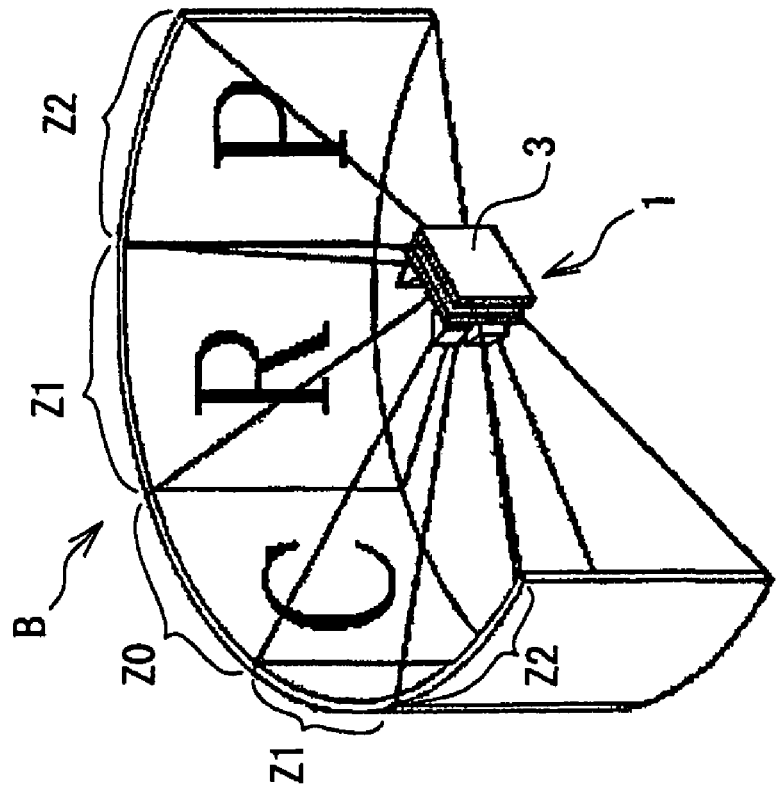
Figure 5:
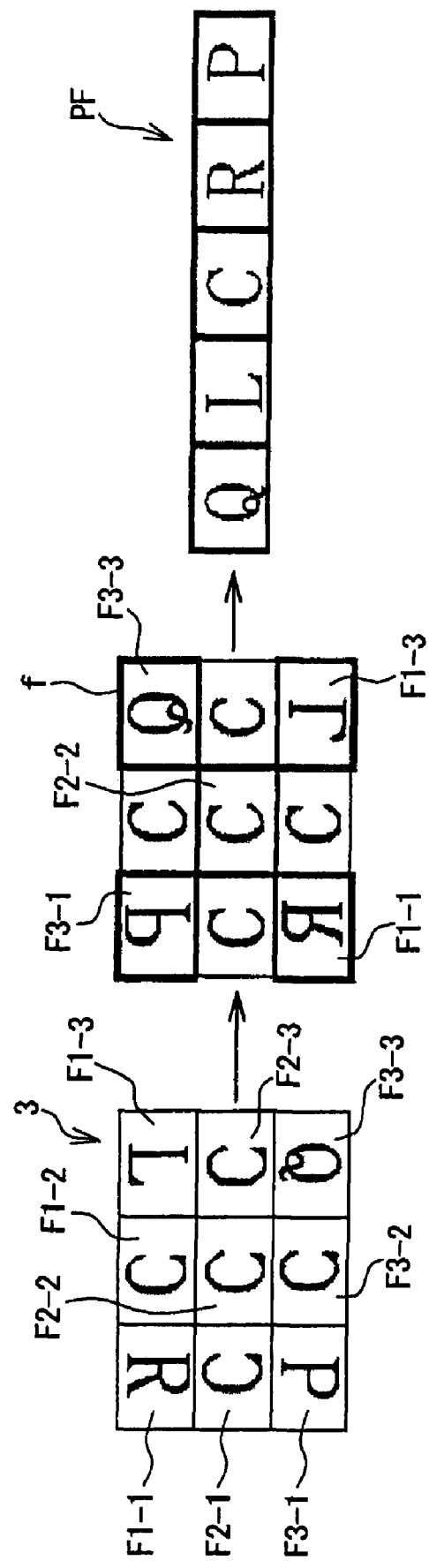
FIG. 5 is a schematic view of, on the left, a matrix image of unit images on a photodetector array of the panoramic imaging device as well as matrix images in the middle and on the right, showing a process of how the unit images, as image information, are processed to form a panoramic image.

Referring to FIG. 4A, FIG. 4B and FIG. 5, the operation of the panoramic imaging device 1 will be described in detail. FIG. 4A and FIG. 4B are schematic perspective views of the panoramic imaging device 1 placed facing a target object B to be imaged in a range of 180° as seen from diagonally left above and diagonally right above, respectively. On the other hand, the image on the photodetector array 3 shown in the left matrix image of FIG. 5 is an image as seen from the target object B. Here it is assumed that as shown in FIG. 4A and FIG. 4B, the target object B placed in front of the panoramic imaging device 1 has equiangular (or equilength) image segments of "Q", "C", "R" and "P" in successive 36° angular ranges in the capture angle (picture-taking angle) of 180°. In this case, the central image segment of "C" (i.e. center image segment in the center 36° angular range) is inverted up/down and left/right by the center lens L2-2 as described above to form the unit image F2-2 of "C" at the center of the photodetector array 3, which, however, is inverted only up/down from the original image segment of "C" when such unit images F2-2 of "C" is seen from the target object B.

Note that in the present embodiment, not only the center lens L2-2 but also the optical lenses L1-2, L2-1, L2-3, L3-2 receive lights entering in the front range of approximately 36°. Accordingly, as shown in the left matrix image of FIG. 5, the unit images F1-2, F2-1, F2-3, F3-2, which are inverted up/down from the original image segment of "C" at the center of the target object B, are formed at corresponding positions on the photodetector array 3. On the other hand, the image segment of "L" and the image segment of "R" in the first left and right ranges Z1 adjacent to the front range of 36° (designated by Z0 in FIG. 4A and FIG. 4B) are inverted left/right by the 45-45-90 right-angle prisms P1-1, P1-3, respectively, and are then inverted up/down and left/right by the side lenses L1-1, L1-3, respectively, to form unit images F1-1, F1-3 of "R" and "L" at corresponding positions on the photodetector array 3 as shown in the left matrix image of FIG. 5. These unit images of "L" and "R" when seen from the target object B, are inverted up/down and left/right as shown in the left matrix image of FIG. 5.

In a similar manner, the image segment of "Q" and the image segment of "P" in the second left and right ranges Z2 adjacent to the first left and right ranges Z1 are inverted left/right by the 45-45-90 right-angle prisms P3-1, P3-3, respectively, and are then inverted up/down and left/right by the side lenses L3-1, L3-3, respectively, to form unit images F3-1, F3-3 of "P" and "Q" at corresponding positions on the photodetector array 3 as shown in the left matrix image of FIG. 5. These unit images of "Q" and "P", when seen from the target object B, are inverted up/down and left/right as shown in the left matrix image of FIG. 5.

These nine unit images F1-1, F1-2, . . . are converted by the photodetector array 3 to image information. The image information generated by the conversion on the photodetector array 3 are sequentially read from the lowermost-leftmost pixel to the uppermost-rightmost pixel of the photodetector array 3 shown in the left matrix image of FIG. 5. As shown in the middle matrix image (intermediate step) of FIG. 5, the sequentially read image information are inverted up/down from the image information on the photodetector array 3 shown in the left matrix image of FIG. 5 for restoration of normal images. However, the images of "P", "Q", "L" and "R" except for "C" are still not fully restored to be normal.

More specifically, the positions of the left and right columns of "P", "Q", "L" and "R" are exchanged with or reversed from the original positions of "P", "Q", "L" and "R" on the target object B, while the images of "P", "Q", "L" and "R" per se in the left and right columns in the middle matrix image in FIG. 5 are inverted left/right from the original images of "P", "Q", "L" and "R" on the target object B. These image information in the middle matrix image in FIG. 5 are processed by the image reproduction microprocessor 6 to reverse the positions of the left and right columns, and to invert the images of "P", "Q", "L" and "R" per se therein, thereby reproducing a panoramic image (one-row matrix image) PF with a picture angle of 180° (degrees) as shown in FIG. 5. Note that the middle matrix image of FIG. 5 shows an image at an intermediate step in the process performed by the image reproduction microprocessor 6, and can be displayed on the display unit 7. This will be described in more detail below.

The image reproduction microprocessor 6 performs image processing based on the image information of the five unit images F3-1, F3-3, F2-2, F1-1, F1-3 of "P", "Q", "C", "R" and "L" in the middle matrix image indicated by bold frames f in FIG. 5. More specifically, the image reproduction microprocessor 6 mirror-inverts, and thereby restores, the unit images F3-1, F3-3, F1-3, F1-1 of "P", "Q", "L" and "R" (having been inverted left/right) back to normal images of "P", "Q", "L" and "R", respectively, and then combines these normal images of "P", "Q", "L" and "R" with the center unit image of "C" by properly positioning the normal images of "P", "Q", "L" and "R" relative to the center unit image of "C", so as to reproduce or form the panoramic image PF (one-row matrix image) with a picture angle of 180° shown in FIG. 5.

An advantage of the panoramic imaging device 1 according to the present embodiment is that the respective unit images F1-1, F1-3, . . . have substantially no distortions at peripheries thereof because the center lens L2-2 and the side lenses L1-1, L1-3, L3-1, L3-3 have a capture angle as small as 36° (which is smaller than approximately 60°), so that no complex process of distortion correction for the respective unit images is required when combining the unit images. Furthermore, since each of the unit images F1-1, F1-3, is an image in a range of approximately 36°, the five unit images can be combined with substantially no overlap between adjacent two of the unit images. Thus, the panoramic imaging device 1 can combine multiple images into a panoramic image without complex image correction and without causing unnatural transition between adjacent images to remain, and further which can be reduced in volume and thickness in its entirety.

Note that the image reproduction microprocessor 6 in the present embodiment performs image processing based on the image information of the unit image F2-2 of "C" at the center of the photodetector array 3. However, as shown e.g. in the left matrix image of FIG. 5, each of the unit images F1-2, F2-1, F2-3, F3-2 is also an image of "C" corresponding to the image segment of "C" at the center of the target object B. Accordingly, it is also possible for the image reproduction microprocessor 6 to reproduce a panoramic image PF by using the image information of one of the unit images F1-2, F2-1, F2-3, F3-2. In this case, one of the optical lenses L1-2, L2-1, L2-3, L3-2 used for forming the one of the unit images F1-2, F2-1, F2-3, F3-2, which is used for the reproduction of the panoramic image PF here, corresponds to and serves as the "center lens" defined above and in claims 1 and 5. Conversely, if the unit images F1-2, F2-1, F2-3, F3-2 are not used to reproduce a panoramic image PF, the optical lenses L1-2, L2-1, L2-3, L3-2 can be omitted. Alternatively, stop apertures corresponding to the respective optical lenses L1-2, L2-1, L2-3, L3-2 can be closed so as to prevent unit images from being formed at row 1-column 2 position, row 2-column 1 position, row 2-column 3 position and row 3-column 2 position.

Figure 6:
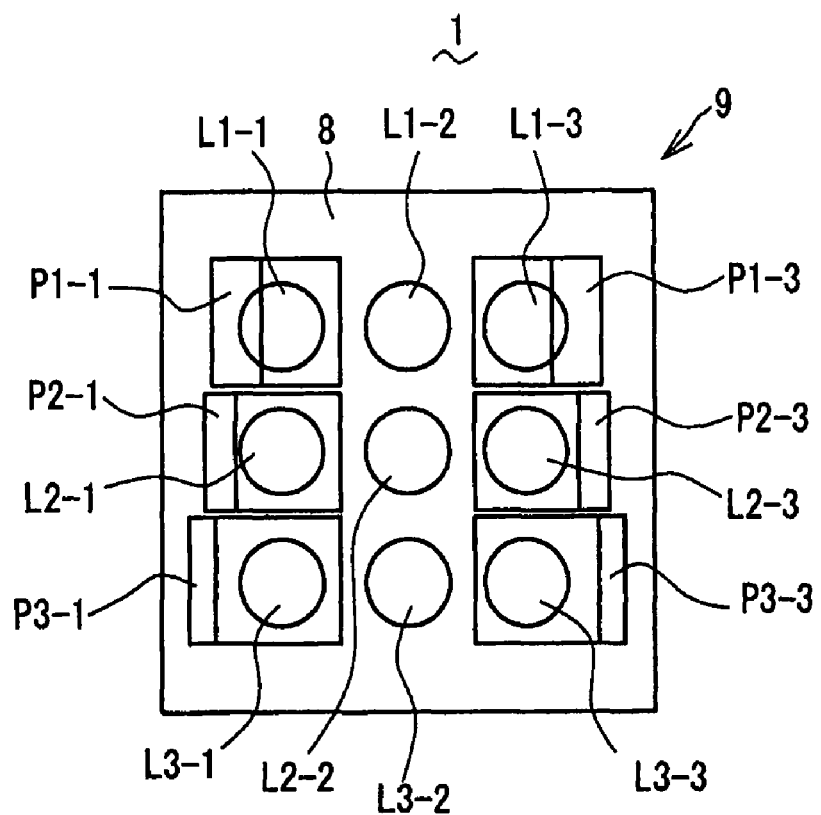
FIG. 6 is a schematic front view of a panoramic imaging device according to a first modified example.
Figure 7:
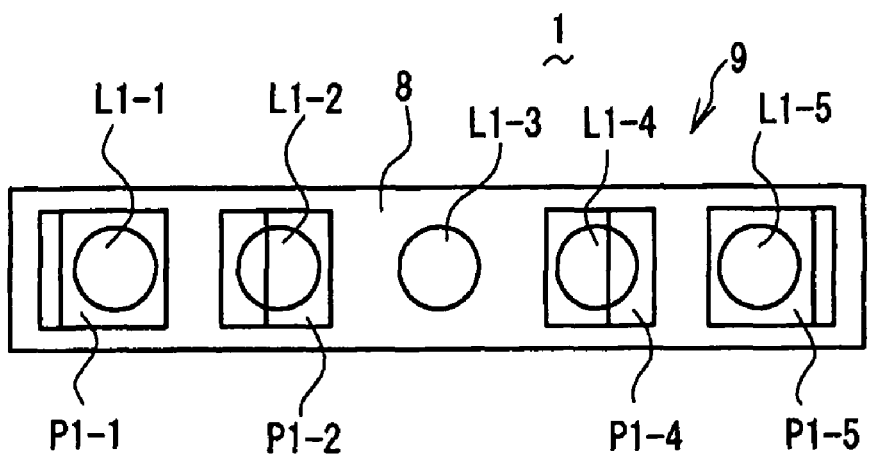
FIG. 7 is a schematic front view of a panoramic imaging device according to a second modified example.

Referring now to FIG. 6 and FIG. 7, panoramic imaging devices 1 according to a first modified example and a second modified example of the present embodiment will be described hereinafter. As shown in FIG. 6, the panoramic imaging device 1 according to the first modified example has six 45-45-90 right-angle prisms P1-1, P1-3, P2-1, P2-3, P3-1, P3-3 placed facing optical lenses L1-1, L1-3, L2-1, L2-3, L3-1, L3-3, respectively. The 45-45-90 right-angle prisms P1-1, P1-3 in the first row, those P3-1, P3-3 in the third row, and those P2-1, P2-3 in the second row are inclined to the optical lens array 9 at the largest angle, the smallest angle and an intermediate angle, respectively.

Because of the largest inclination relative to the optical lens array 9, the 45-45-90 right-angle prisms P1-1, P1-3 in the first row bend and collect lights entering in the left and right ranges closest to the front range in the capture angle. Because of the smallest inclination relative to the optical lens array 9, the 45-45-90 right-angle prisms P3-1, P3-3 in the third row bend and collect lights entering in the left and right ranges farthest from the front range in the capture angle. On the other hand, because of the intermediate inclination relative to the optical lens array 9, the 45-45-90 right-angle prisms P2-1, P2-3 in the second row bend and collect lights entering in the intermediate left and right ranges from the front range in the capture angle.

More specifically, the optical lens L2-2 at the center receives light entering in a front range of approximately 26° among lights entering in the capture angle of 180°. This optical lens L2-2 corresponds to and serves as the "center lens". The capture angle of 180° less the front range of approximately 26 is divided into left and right ranges each of approximately 77°, which are further divided into three pairs of left and right ranges that are a pair closest to the front range, an intermediate pair and a pair farthest from the front range. In each pair, each of the left and right ranges is a range of approximately 26°. The 45-45-90 right-angle prisms P1-1, P1-3 respectively bend and collect lights entering in the pair of left and right ranges, each of approximately 26°, which are closest to the front range, so as to allow the lights to enter the optical lenses L1-1, L1-3.

Further, the 45-45-90 right-angle prisms P2-1, P2-3 respectively bend and collect lights entering in the pair of left and right ranges, each of approximately 26°, which are intermediate or next closest to the front range, so as to allow the lights to enter the optical lenses L2-1, L2-3. On the other hand, the 45-45-90 right-angle prisms P3-1, P3-3 respectively bend and collect lights entering in the pair of left and right ranges, each of approximately 26°, which are farthest the front range, so as to allow the lights to enter the optical lenses L3-1, L3-3. According to the first modified example, the six optical lenses L1-1, L1-3, L2-1, L2-3, L3-1, L3-3 correspond to and serve as the "side lenses".

As a result, the panoramic imaging device 1 of the first modified example forms, on the photodetector array 3, seven unit images composed of a unit image corresponding to the front range of approximately 26° and six unit images corresponding to the three pairs of left and right ranges each of approximately 26° as divided from the left and right ranges each of approximately 77°. The panoramic imaging device 1 combines the seven unit images to reproduce a panoramic image PF. Since each of the optical lenses L1-1, L1-2, ... is only required to have a capture angle as small as 26°, the panoramic imaging device 1 of the first modified example enables a further reduction of the distortion in each unit image formed on the photodetector array 3 as well as a further reduction of the unnatural transition between adjacent images combined and reproduced into a panoramic image PF. Note that instead of dividing each of the left or right ranges each of approximately 77° (less the front range of approximately 26°) into three ranges each of approximately 26°, it is possible to divide each of the left and right ranges each of approximately 77° into another set of three ranges such as 30°, 25° and 22°

As shown in FIG. 7, the panoramic imaging device 1 according to the second modified example has an optical lens array 9 of 1 (one) row and 5 (five) columns, in which four 45-45-90 right-angle prisms P1-1, P1-2, P1-4, P1-5 are placed facing the optical lenses L1-1, L1-2, L1-4, L1-5, respectively. Correspondingly, the photodetector array 3 is formed to have an elongated shape so as to form the one row-five column unit images thereon. According to the second modified example, the four optical lenses L1-1, L1-2, L1-4, L1-5 correspond to and serve as the "side lenses", while the center optical lens L1-3 corresponds to and serves as the "center lens". The 45-45-90 right-angle prisms P1-2, P1-4 are fixed and inclined to the optical lens array 9 at a relatively large angle, while those P1-1, P1-5 are fixed and inclined to the optical lens array 3 at a relatively small angle. Thus, the 45-45-90 right-angle prisms P1-2, P1-4 bend and collect lights entering in the left and right ranges (first left and right ranges) closer to the front range in the capture angle corresponding to the optical lens L2-2. On the other hand, the 45-45-90 right-angle prisms P1-1, P1-5 bend and collect lights entering in the left and right ranges (second left and right ranges) farther from the front range in the capture angle.

As a result, the panoramic imaging device 1 of the second modified example forms, on the photodetector array 3, five unit images composed of a unit image corresponding to the front range and four unit images in the first left and right ranges and the second left and right ranges. The panoramic imaging device 1 combines the five unit images to reproduce a panoramic image PF. Since each of the optical lens array 9 and the photodetector array 3 is significantly reduced in area, the panoramic imaging device 1 can be further reduced in volume and thickness. Note that in the present embodiment including the first and second modified examples, the prisms to bend and collect the lights entering in left and right ranges in a capture angle to guide the lights to the side lenses are not limited to 45-45-90 right-angle prisms, but can be 30-60-90 right-angle prisms or equilateral triangular prisms.

Also note that the above-described embodiment describes the case where the picture angle of the panoramic image is approximately 180°. However, it is apparent that the picture angle of the panoramic image can be expanded by simply increasing the capture angle or range of each prism used to bend, collect and guide light to each optical lens. Further note that the above-described embodiment describes the case where the capture range of each prism and optical lens is approximately 36° or approximately 26° or the like. However, the capture range is not limited to such ones and can be any one less than approximately 60°. It is apparent that the advantage of the panoramic imaging device 1 can be enjoyed if the capture range for each prism and optical lens is smaller than approximately 60°, because thereby an optical lens which does not cause image distortion can be used for each of the capture ranges.

As described in the foregoing, in the panoramic imaging device 1 according to the present embodiment, the capture angle less the front range is divided into left and right ranges, which are further divided into multiple pairs of left and right ranges, such that lights entering in the multiple pairs of left and right ranges are bent and collected by prisms respectively positioned corresponding to the multiple pairs of ranges so as to be guided to the respective side lenses. Accordingly, the panoramic imaging device 1 can be formed without using optical lenses having a large capture angle (wide-angle lenses) such as 60° or larger, making it possible for the formed unit images to have substantially no distortions, so that no complex process of image correction for the unit images is required when combining the unit images, and that the unit images can be combined into a panoramic image PF of a picture angle of at least or approximately 180° without causing unnatural transition between adjacent unit images. This also makes it possible to reduce the volume and thickness of the entire panoramic imaging device 1.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2006-219158 filed Aug. 11, 2006, the content of which is hereby incorporated by reference.

What is claimed is:

1. A panoramic imaging device comprising:
an optical lens system for collecting light entering in a capture angle of at least 180° so as to form images on a predetermined focal plane;
imaging means placed at the focal plane for converting the images formed by the optical lens system to electronic image information; and
image reproducing means for subjecting the electronic image information obtained from the imaging means to imaging processing so as to reproduce a panoramic image,
wherein the optical lens system comprises:
an optical lens array including a center lens having an optical axis and formed on one plane for receiving light entering in a front range in the capture angle, and also including pairs of left and right side lenses formed on the one plane and on left and right sides of the center lens, respectively, and which have optical axes parallel to that of the center lens, so as to respectively receive lights entering in left and right ranges in the capture angle, which are divided into pairs of left and right ranges such that the pairs of left and right side lenses receive lights entering in the divided pairs of the left and right ranges, respectively; and
prisms placed on a light entrance side of the side lenses for bending and collecting the lights entering in the divided pairs of the left and right ranges in the capture angle for the side lenses to receive, so as to guide and direct the lights to, and along the optical axes of, the side lenses, respectively;
wherein the imaging means is formed of a photodetector array placed at a predetermined distance from, and in parallel to, the optical lens array for capturing an image formed by the center lens and images formed by the left and right side lenses; and
wherein the image reproducing means combines the image formed by the center lens in the front range in the capture angle with the images respectively formed by the pairs of left and right side lenses in the divided pairs of left and right ranges in the capture angle so as to reproduce a panoramic image with a picture angle of at least 180°; and
wherein each of the lights received by the center lens and the side lenses is light entering in a range smaller than approximately 60° in the capture angle of at least 180°.

2. The panoramic imaging device according to claim 1, wherein the capture angle is approximately 180°,
wherein the light received by the center lens is light entering in a front range of approximately 36° in the capture angle, and
wherein the side lenses are composed of two left side lenses and two right side lenses which receive lights entering in divided two pairs of left and right ranges each of approximately 36°, respectively, which enter in a pair of left and right ranges each of approximately 72° in the capture angle, respectively.

3. The panoramic imaging device according to claim 1,
wherein the capture angle is approximately 180°,
wherein the light received by the center lens is light entering in a front range of approximately 26° in the capture angle, and
wherein the side lenses are composed of three left side lenses and three right side lenses which receive lights entering in divided three pairs of left and right ranges each of approximately 26°, respectively, which enter in a pair of left and right ranges each of approximately 77° in the capture angle, respectively.

4. A panoramic imaging device comprising:
an optical lens system for collecting light entering in a capture angle of approximately 180° so as to form images on a predetermined focal plane;
imaging means placed at the focal plane for converting the images formed by the optical lens system to electronic image information; and
image reproducing means for subjecting the electronic image information obtained from the imaging means to imaging processing so as to reproduce a panoramic image,
wherein the optical lens system comprises:
an optical lens array including a center lens having an optical axis and formed on one plane for receiving light entering in a front range of approximately 36° in the capture angle, and also including two pairs of left and right side lenses formed on the one plane and on left and right sides of the center lens, respectively, and which have optical axes parallel to that of the center lens, so as to respectively receive lights entering in left and right ranges each of approximately 72° in the capture angle, which are divided into two pairs of left and right ranges each of approximately 36° such that the two pairs of left and right side lenses receive lights entering in the divided two pairs of the left and right ranges, respectively; and
two pairs of left and right right-angle prisms placed on a light entrance side of the side lenses, and respectively facing the side lenses at positions to prevent interruption of the light entering the center lens in the front range of approximately 36°, for bending and collecting the lights entering in the divided two pairs of the left and right ranges each of approximately 36° in the capture angle for the side lenses to receive, so as to guide and direct the lights to, and along the optical axes of, the side lenses, respectively,
wherein the imaging means is formed of a photodetector array placed at a predetermined distance from, and in parallel to, the optical lens array for capturing an image formed by the center lens and images formed by the two pairs of left and right side lenses, and wherein the image reproducing means combines the image formed by the center lens in the front range of approximately 36° in the capture angle with four images respectively formed by the two pairs of left and right side lenses in the divided two pairs of left and right ranges each of approximately 36° in the capture angle so as to reproduce a panoramic image with a picture angle of approximately 180°.

* * * * *